(12) United States Patent
Field et al.

(10) Patent No.: US 9,205,501 B2
(45) Date of Patent: Dec. 8, 2015

(54) HAND SAW

(75) Inventors: Robert Field, Munich (DE); Manfred Geier, Puchheim (DE)

(73) Assignee: Irwin Industrial Tool Company, Huntersville, NC (US)

( * ) Notice: Subject to any disclaimer, the term of this patent is extended or adjusted under 35 U.S.C. 154(b) by 1072 days.

(21) Appl. No.: 12/064,912

(22) PCT Filed: Aug. 18, 2006

(86) PCT No.: PCT/EP2006/008166
§ 371 (c)(1),
(2), (4) Date: Jun. 20, 2008

(87) PCT Pub. No.: WO2007/025654
PCT Pub. Date: Mar. 8, 2007

(65) Prior Publication Data
US 2009/0300926 A1    Dec. 10, 2009

(30) Foreign Application Priority Data

Aug. 29, 2005 (DE) .......... 10 2005 040 896

(51) Int. Cl.
| | |
|---|---|
| *B23D 49/10* | (2006.01) |
| *B23D 51/01* | (2006.01) |
| *B23D 49/11* | (2006.01) |
| *B23D 61/12* | (2006.01) |
| *B27B 21/04* | (2006.01) |

(52) U.S. Cl.
CPC .............. *B23D 49/10* (2013.01); *B23D 49/11* (2013.01); *B23D 51/01* (2013.01); *B23D 61/121* (2013.01); *B27B 21/04* (2013.01)

(58) Field of Classification Search
CPC ........ B23D 49/00; B23D 49/10; B23D 49/11; B23D 51/01
USPC ............................. 30/517, 519, 520
See application file for complete search history.

(56) References Cited

U.S. PATENT DOCUMENTS

| | | | | |
|---|---|---|---|---|
| 703,334 | A * | 6/1902 | Carey | 30/519 |
| 1,060,312 | A * | 4/1913 | Bradley | 30/510 |
| 2,621,689 | A * | 12/1952 | Fordon | 30/519 |
| 2003/0000092 | A1 | 1/2003 | Liu | |
| 2005/0126011 | A1 | 6/2005 | Pool | |

FOREIGN PATENT DOCUMENTS

| | | |
|---|---|---|
| DE | 1503991 | 4/1970 |
| JP | 09109105 | 4/1997 |

OTHER PUBLICATIONS

Irwin Industrial Tools GmbH, International Search Report corresponding to International Patent Application No. PCT/EP06/08166, dated Nov. 22, 2006.

* cited by examiner

*Primary Examiner* — Phong Nguyen
(74) *Attorney, Agent, or Firm* — Sutherland Asbill & Brennan LLP

(57) ABSTRACT

A hand saw comprising a handle for actuating the hand saw and a saw blade connected to the handle and provided with a toothed cutting edge, the handle comprising a handle grip clasped by the hand of the user to impart an actuating force to the handle, and the handle grip defining a force entry direction in which the actuating force is introduced into the saw blade, wherein when the hand saw is pushed the force entry direction intersects the cutting edge of the saw blade in the region of a first quarter length of the cutting edge near to the handle or in the region of an imaginary elongation of the cutting edge into the handle.

15 Claims, 3 Drawing Sheets

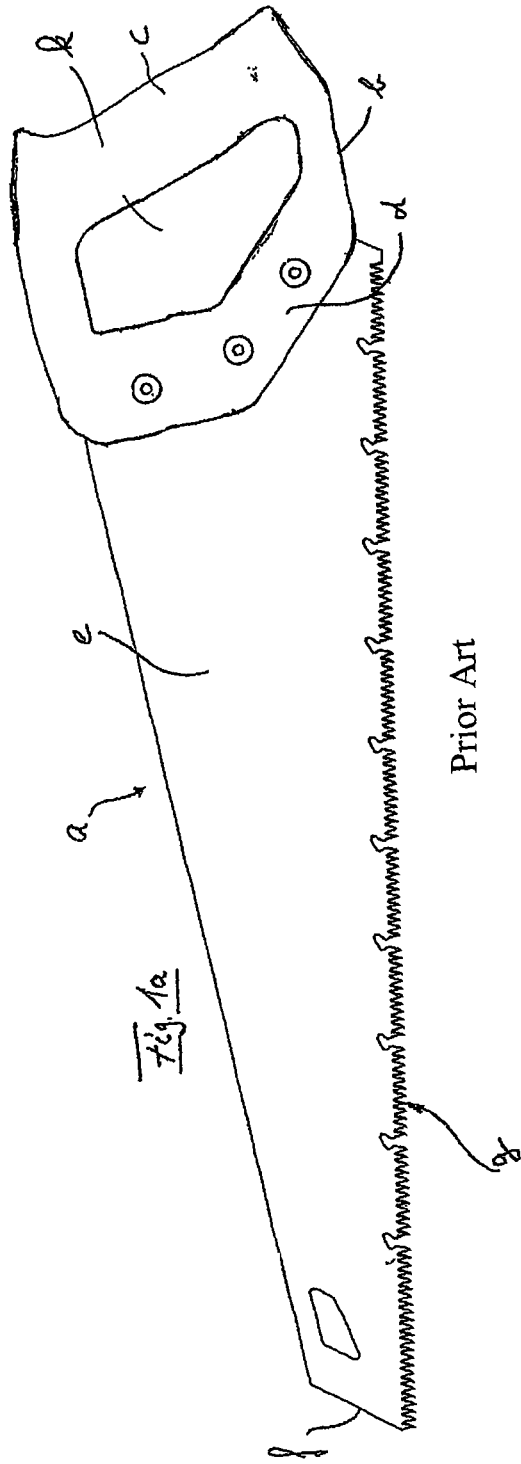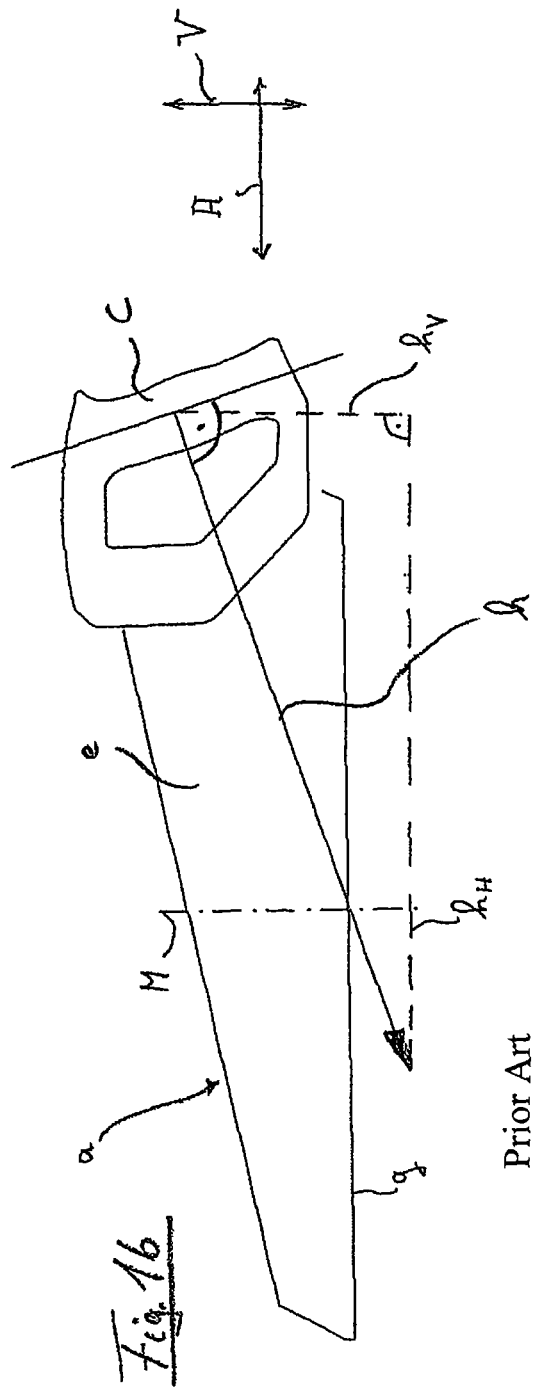

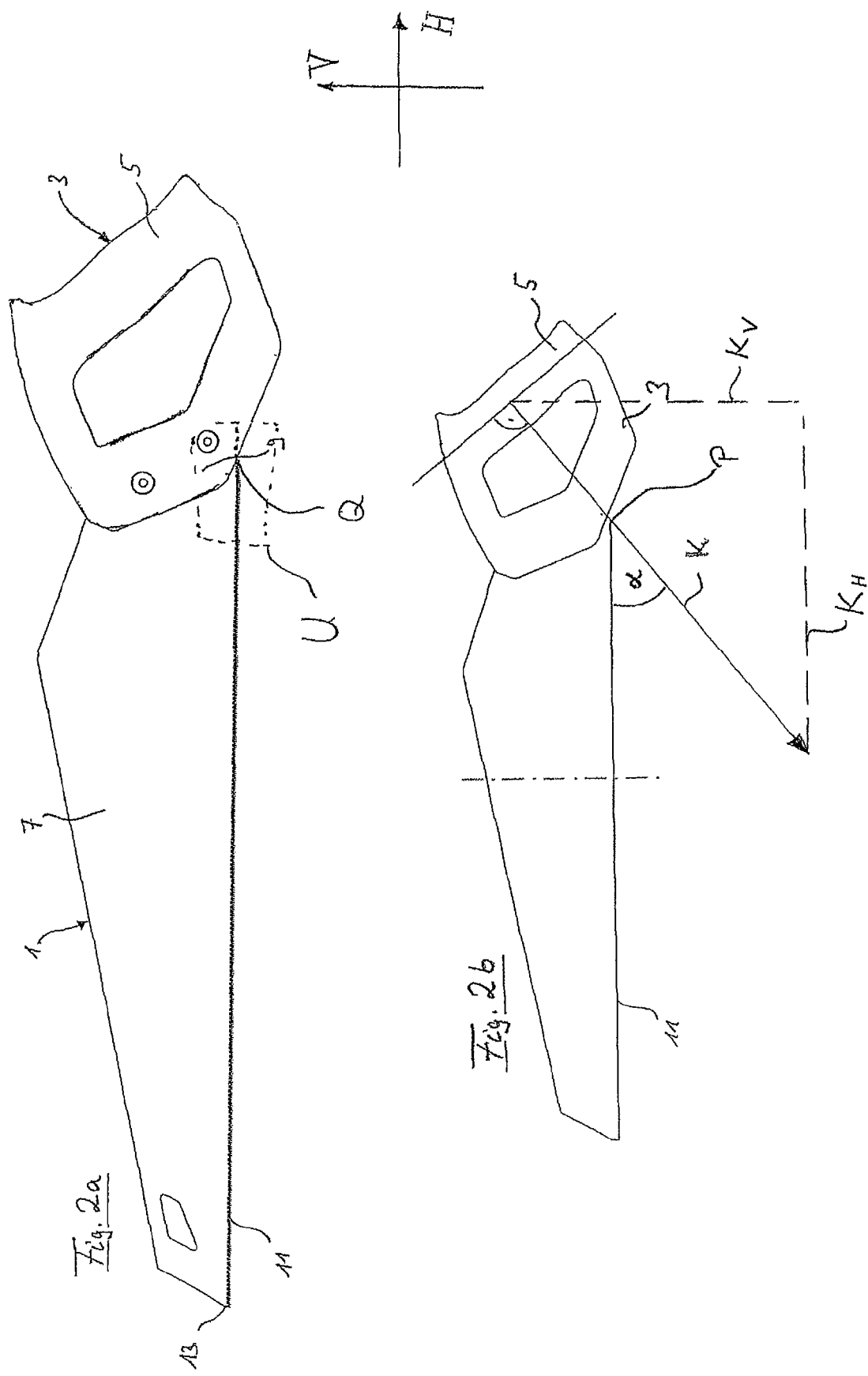

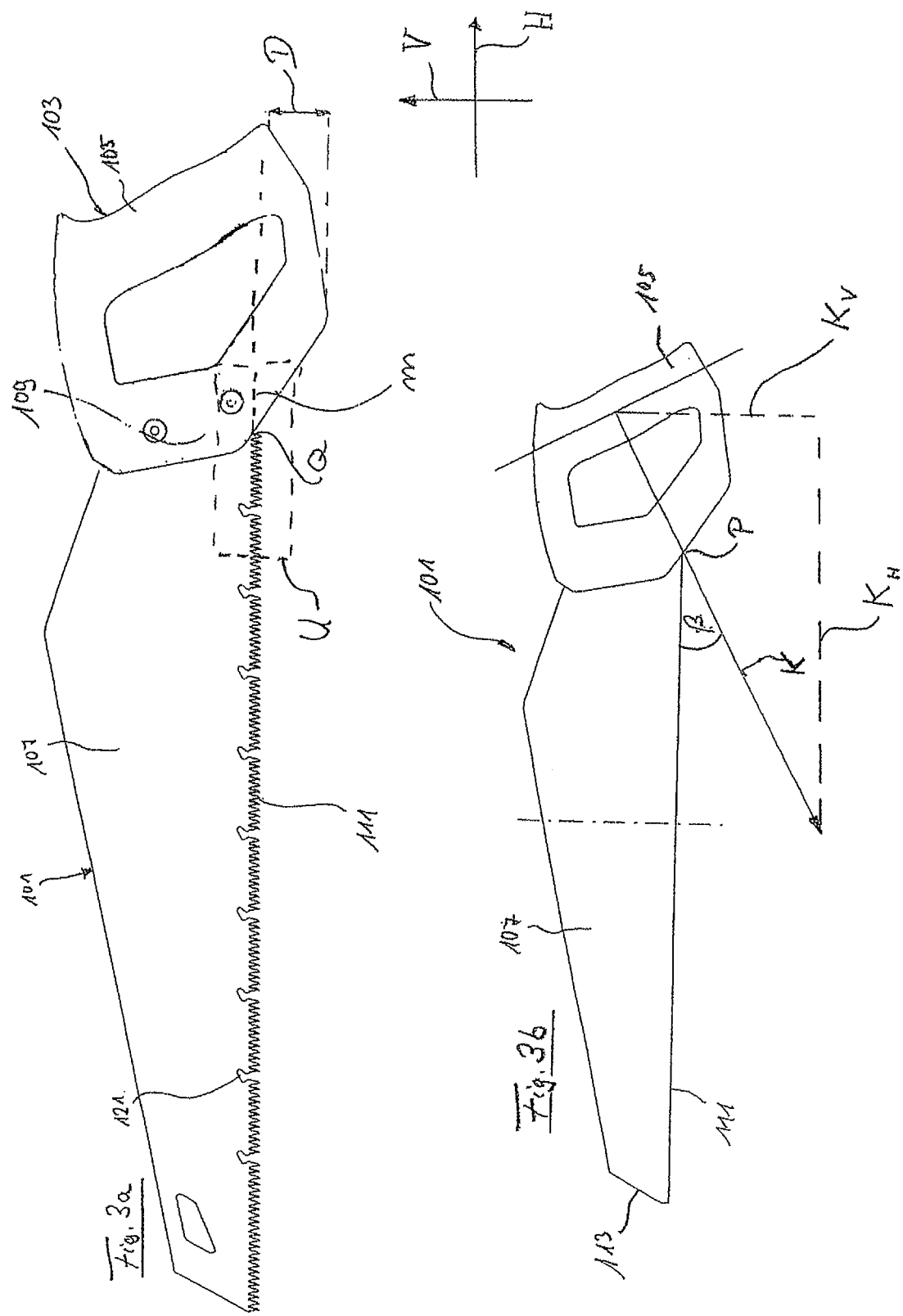

HAND SAW

The invention relates to a hand saw having a handle for actuating the hand saw and a saw blade. Pushing and pulling causes the toothed cutting edge of the saw blade to bite into a workpiece, producing debris.

Modern hand saws have teeth with opposing flanks, both of which are keenly sharp and hardened to thus optimize how efficiently the teeth bite into the workpiece. The handle of the hand saw usually features a handle grip facing away from the saw blade for grasping to actuate the hand saw. When pushing the saw the handle receives a force actuating it in the direction of the saw blade in which a vertical force component causes the teeth to bite into the workpiece whilst the horizontal force component is responsible for the pushing and pulling motion of the hand saw.

One known hand saw with a proven record of success in everyday use because of its very high cutting efficiency is illustrated in FIG. 1a. The hand saw (a) comprises a handle (b) with a handle grip (c) and a heel mount (d), the handle grip (c) and heel mount (d) forming a one-piece substantially annular structure defining a space (k) for finger clasping. Fixedly and unadjustably secured to the heel mount (d) is a metal saw blade having a plate shape (e), the height of which is continually reduced from the handle grip (c) to the nose (f). The saw blade (e) comprises a substantially straight cutting edge (g) configured with a row of teeth, the teeth of which have a substantially identical geometry. Configured between two groups in the row of teeth is a substantially L-shaped recess extending into the saw blade for receiving and ejecting debris from the kerf in the workpiece.

Indicated in FIG. 1b is a force entry vector, the direction of which defines how the actuating force imparted by the user to push the handle grip c is directed into the saw blade (e). The active direction of the force entry vector is defined substantially as a perpendicular to the longitudinal extent of the handle grip (c) clasped by the fingers of the user. The force entry vector starts substantially in the longitudinal center of the handle grip (c) and is split into a horizontal component ($h_H$) and a vertical component $h_V$. As evident from FIG. 1b it is the horizontal component $h_H$ which is clearly dominant, requiring a user to impart most of the actuating force needed to perform pushing the saw blade. The force entry vector intersects the cutting edge (g) substantially in the middle of the saw blade defined by the centerline (M) perpendicular to the cutting edge (g).

Defining the intersection of the force entry direction substantially level with the centerline M is based on the technical assumption that this makes best use of the full length of the hand saw in ensuring optimum handling of the hand saw when starting the kerf. Despite the good sawing effectiveness of the known hand saw it is difficult for a user having little skill to start a fresh kerf and maintain the hand saw in the fresh kerf. Instead, the known hand saw tends to either jump out of the fresh kerf when starting, splintering the workpiece bordering the kerf or it binds in the workpiece making it necessary to start all over again.

It is the object of the invention to sophisticate a hand saw substantially operated by pushing and having a handle for actuating the hand saw and a saw blade so that handling the hand saw when starting the kerf is improved with no detriment to the sawing effectiveness of the hand saw.

In accordance therewith a force entry direction defined by the handle grip of the handle imparting the actuating force to the hand saw in which the imparted actuating force is directed into the saw blade when pushed is now defined such that it intersects the cutting edge of the saw blade in a region of a first quarter length of the cutting edge near to the handle or an imaginary elongation of the cutting edge in the region of the handle. Particularly, the force entry direction intersects the cutting edge of the saw blade in the region of the transition between the handle and the saw blade.

It has been surprisingly discovered that shifting the intersection towards the handle grip to between the force entry direction when pushing the hand saw and the cutting edge makes it significantly easier to start the kerf in the virgin material of a workpiece. This achievement of the invention improves handling the hand saw to such an extent that even an unskilled user can now directly achieve continuous sawing of the workpiece with just a single starting cut, this improvement in handling surprisingly resulting in no reduction in sawing effectiveness. On the contrary, tests have shown surprisingly that because of the improved handling of the hand saw in accordance with the invention a workpiece can now be severed with substantially fewer pushes of the saw than with the known hand saw having an identical saw blade configuration. It was also found out that user fatigue occurred much later when using the hand saw in accordance with the invention as compared to the known hand saw. Shifting the intersection towards the handle to between the force entry direction and the cutting edge now permits imparting higher vertical force components to the workpiece for the same actuating force, causing the teeth of the cutting edge to bite deeper into the workpiece. It is this aspect in accordance with the invention that now makes it possible to enhance the effectiveness of each pushing and pulling action of the saw because the forces actuating the teeth of the saw are now evenly distributed over the entirety of the saw blade. Shifting the intersection towards the handle prevents, for one thing, excessive sawing forces being imparted to the workpiece in the region of the middle of the cutting edge. Excessive vertical sawing forces can produce consolidations in the workpiece being sawn which need to be avoided because they fail to promote sawing. By contrast, the invention now ensures that substantially the same actuating force is imparted by every tooth to the workpiece so that even the nose of the cutting edge of the saw blade normally less effective is now more involved actively in improving sawing.

In this arrangement the intersection is to be shifted so far towards, or even beyond, the handle so that no matter how the saw is operated it is always avoided that the bite of the cutting edge in the workpiece and the intersection between force entry direction and cutting edge coincide.

In one preferred aspect of the invention the force entry direction intersects the cutting edge of the saw blade at the transition between handle and saw blade, it being this configuration that would appear to optimize handling the hand saw.

One design aspect to achieve shifting the intersection between the force entry direction when pushing the saw and the cutting edge towards the handle involves shifting the handle and/or the handle grip towards the cutting edge of the saw blade in a direction perpendicular to the cutting edge. Shifting the handle grip towards the cutting edge enables the angle of inclination between the force entry direction and the cutting edge—in other words the ratio of vertical and horizontal components of the actuating force—to be maintained constant. Preferably the handle and/or the handle grip can be shifted so far to the cutting edge that an imaginary elongation of the cutting edge intersects the handle and/or the handle grip in a region of a first quarter of the height of the handle near to the cutting edge.

Another possibility of achieving the wanted shift of the force entry direction towards the handle without changing the structure of the known hand saw, particularly the heel where saw blade and handle join, involves increasing the angle of inclination between the force entry direction and the substantially linear profile of the cutting edge by inclining the handle grip more in the direction of the cutting edge of the saw blade.

Both possibilities can be combined.

In one aspect the invention, depending or not depending on that as explained above, the angle of inclination between the force entry direction when pushing the hand saw and the linear profile of the cutting edge is greater than 25°, particularly good handling of starting the kerf and sawing effectiveness being achieved when the angle of inclination is in the range of 35° to 45°. Preferably the angle of inclination needs to be smaller than 60°. In considering the angle of inclination to the cutting edge as a reference line, should no straight reference line exist for the cutting edge, where a wavey cutting edge is involved, for example, the corresponding center line of the wavey cutting edge can be taken as the reference line and should an arcuate cutting edge be selected the reference line for the cutting angle is the tangent to the transition between the force entry direction and the arcuate cutting edge.

Further advantages, properties and features of the invention will now be detained by way of the following description of a preferred embodiment of the invention with reference to the attached drawings in which:

FIG. 1a is a side view of a prior art hand saw;

FIG. 1b is a diagrammatic view of the hand saw as shown in FIG. 1a illustrating the actuating force profile in pushing the hand saw;

FIG. 2a is a side view of the hand saw in accordance with the invention;

FIG. 2b is a diagrammatic view of the hand saw as shown in FIG. 2a illustrating the actuating force profile in pushing the hand saw;

FIG. 3a is a side view of the hand saw in accordance with the invention in another aspect, and FIG. 3b is a diagrammatic view of the hand saw as shown in FIG. 3a illustrating the actuating force profile in pushing the hand saw.

Referring now to FIG. 2a there is illustrated how the hand saw 1 in accordance with the invention comprises a handle 3 which is identical to the handle (b) of the known hand saw as shown in FIG. 1a.

The handle 3 comprises remote from a saw blade 7 a handle grip 5 for finger clasping by the user. In addition the handle 3 includes a heel mount 9 to which the saw blade 7 is fixedly and unadjustably secured.

The saw blade 7 of the hand saw as shown in FIG. 2a has a continually cutting edge 11 extending uninterrupted from the nose 13 of the saw to the handle 3.

When comparing the design of the hand saw as shown in FIG. 1a with that as shown in FIG. 2a it is obvious that the handle 3 is shifted significantly in the vertical direction V towards the cutting edge 11. In addition, the handle grip 5 is now inclined much stronger towards the cutting edge 11 than the handle grip c of the known hand saw a as shown in FIG. 1a.

To reduce the weight of the hand saw 1 an excess portion of the saw blade at the side of the saw blade 7 opposite the cutting edge 11 is removed in the region of the handle 3.

Referring now to FIG. 2b there is illustrated how, when the hand saw is pushed, the force entry vector K defined by the handle grip 5 now intersects the cutting edge 11 due to the handle 3 being positioned lowered and inclined relative to the cutting edge 11 at the transition portion U, particularly precisely at the transition (Q) of saw blade 7 and handle 3. The direction of the force entry vector K is defined by the perpendicular to the hand saw of the handle grip 5 resting in the palm of the hand (not shown) of the user. It has been discovered that the nearer the intersection P to the handle the better the handling of the hand saw 1, the angle of inclination between the direction of the force entry vector K and cutting edge 11 being approx. 45°.

The horizontal and vertical components of the force entry vector K are substantially equal so that when actuating the hand saw 1 the force needed to move the hand saw 1 horizontally and for the teeth to bite into the workpiece (not shown) is the same.

Referring now to FIG. 3a there is illustrated a hand saw having the same reference numerals as shown in FIGS. 2a and 2b but elevated by 100 for a better appreciation.

As regards the design of its handle 103 and saw blade 107 the hand saw 101 is substantially identical to hand saw 1 as shown in FIG. 2a. The cutting edge 111 of the saw blade 107 is configured identical to that of the known saw a as shown in FIG. 1a. The saw blade 107 differs from the saw blade 7 as shown in FIG. 2a by its having a coarser toothing, formed into groups by L-shaped debris recesses 121, each group having the same number of teeth.

Referring now to FIG. 3b there is illustrated how, when the hand saw 1 is pushed, the direction of the force entry vector K intersects the cutting edge 111 of the saw blade 107 in the transition portion U, particularly precisely at the transition Q between handle 103 and saw blade 107.

Now, however, unlike the aspect as shown in FIG. 2b, the angle of inclination between the direction of the force entry vector K and the cutting edge 111 at approx. 35° is smaller than the angle of inclination in the aspect as shown in FIG. 2b but larger than that of the known hand saw a as shown in FIG. 1b. To shift the intersection P between the direction of the force entry vector K and the cutting edge 111 as in the aspect as shown in FIG. 3b into the transition portion U between the handle 103 and the saw blade 107, the handle 103 is now shifted much more vertically in the direction V towards the cutting edge 111, resulting in an imaginary elongation m of the cutting edge 111 intersecting the handle 103 in the region of the first quarter of the height D thereof.

It will be appreciated that in both aspects of the hand saw in accordance with the invention the vertical component Kv of the force entry vector K is greater than that of the known hand saw a as shown in FIG. 1a, resulting in a significant improvement in the sawing effectiveness of the hand saw 1, 101 in accordance with the invention as compared to the known hand saw a.

It is understood that the features disclosed in the above description, FIGs. and claims may be of significance both individually and also in any combination in achieving the invention in its various aspects.

LIST OF REFERENCE NUMERALS 1,101 hand saw
3,103 handle
5,105 handle grip
7,107 saw blade
9,109 heel mount
11,111 cutting edge
13,113 nose of saw
121 debris recesses
α, β angle of inclination
D height quarter
H horizontal direction
K force entry vector Kv vertical component of force entry vector K
$K_H$ horizontal component of force entry vector K
m imaginary elongation
P intersection
Q transition
U transition portion
V vertical direction

The invention claimed is:

1. A hand saw comprising: a handle for actuating the hand saw and a saw blade connected to the handle, the saw blade having a plate shape provided with a toothed cutting edge and an upper edge, wherein the saw blade comprises a first end connected to the handle and a second free end, wherein the saw blade and toothed cutting edge extend uninterrupted from the second free end of the saw to the handle such that the toothed cutting edge terminates at the handle, the handle secured to the saw blade in a fixed angular position and comprising a handle grip clasped by the hand of the user to impart an actuating force to the handle, the handle grip being positioned relative to the saw blade to define a force entry direction in which the actuating force is introduced into the saw blade in a direction perpendicular to a longitudinal direction of the handle grip at the longitudinal center of the handle grip, wherein when the hand saw is pushed the force entry direction intersects the cutting edge of the saw blade at a point where the cutting edge meets the handle in a region of an imaginary elongation of the cutting edge into a lower end the handle.

2. The hand saw according to claim 1, wherein the region of an imaginary elongation of the cutting edge intersects the handle and/or the handle grip in the region of a first height quarter D of the handle near to the cutting edge.

3. The hand saw according to claim 1, wherein an angle of inclination between the force entry direction and the cutting edge is greater than or equal to 25° and smaller than 60°.

4. The hand saw according to claim 1, wherein an angle of inclination between the force entry direction and the cutting edge is in the range of 35° to 45°.

5. The hand saw according to claim 1, wherein an angle of inclination between the force entry direction and the cutting edge is greater than 40° and smaller than 60°.

6. The hand saw according to claim 1, wherein an angle of inclination between the force entry direction and the cutting edge is approximately 45°.

7. The hand saw according to claim 1, wherein the handle comprises a support to which the saw blade is fixed and that the handle grip remote from the saw blade and the support are connected to each other such that they form an annular structure, defining a space for the clasping fingers of a user.

8. A hand saw comprising: a handle for actuating the hand saw and a saw blade connected to the handle, the saw blade having a plate shape provided with a toothed cutting edge and an upper edge, wherein the saw blade comprises a first end connected to the handle and a second free end, wherein the saw blade and toothed cutting edge extend uninterrupted from the second free end of the saw to the handle, the handle secured to the saw blade in a fixed angular position and comprising a handle grip clasped by the hand of the user to impart an actuating force to the handle, the handle grip being positioned relative to the saw blade to define a force entry direction in which the actuating force is introduced into the saw blade in a direction perpendicular to a longitudinal direction of the handle grip at the longitudinal center of the handle grip, wherein when the hand saw is pushed the force entry direction intersects the cutting edge of the saw blade at a point where the cutting edge meets the handle in a region of the transition between the handle and the saw blade; said handle grip being positioned relative to the saw blade such that at least a portion of the lower end of the handle grip is positioned on one side of an imaginary elongation of the cutting edge and the second free end and upper edge is positioned on the opposite side of the imaginary elongation of the cutting edge such that the longitudinal center is disposed above at least a portion of the second free end.

9. The hand saw according to claim 8, wherein the region of an imaginary elongation of the cutting edge intersects the handle and/or the handle grip in the region of a first height quarter D of the handle near to the cutting edge.

10. The hand saw according to claim 8, wherein an angle of inclination between the force entry direction and the cutting edge is greater than or equal to 25° and smaller than 60°.

11. The hand saw according to claim 8, wherein an angle of inclination between the force entry direction and the cutting edge is in the range of 35° to 45°.

12. The hand saw according to claim 8, wherein an angle of inclination between the force entry direction and the cutting edge is greater than 40° and smaller than 60°.

13. The hand saw according to claim 8, wherein an angle of inclination between the force entry direction and the cutting edge is approximately 45°.

14. The hand saw according to claim 8, wherein the handle comprises a support to which the saw blade is fixed and that the handle grip remote from the saw blade and the support are connected to each other such that they form an annular structure, defining a space for the clasping fingers of a user.

15. A hand saw comprising: a handle for actuating the hand saw and a saw blade connected to the handle, the saw blade having a plate shape provided with a toothed cutting edge and an upper edge, wherein the saw blade comprises a first end connected to the handle and a second free end, wherein the saw blade and toothed cutting edge extend uninterrupted from the second free end of the saw to the handle such that the toothed cutting edge terminates at the handle and the upper edge comprising a first portion extending away from the toothed cutting edge and from the second free end to a first point and a second portion extending toward the toothed cutting edge from the first point to the handle, the handle secured to the saw blade in a fixed angular position and comprising a handle grip clasped by the hand of the user to impart an actuating force to the handle, the handle grip being positioned relative to the saw blade to define a force entry direction in which the actuating force is introduced into the saw blade in a direction perpendicular to a longitudinal direction of the handle grip at the longitudinal center of the handle grip, wherein when the hand saw is pushed the force entry direction intersects the cutting edge of the saw blade at a second point where the cutting edge meets the handle in a region of an imaginary elongation of the cutting edge into a lower end of the handle.

* * * * *